(12) United States Patent
Coats et al.

(10) Patent No.: US 12,213,479 B2
(45) Date of Patent: Feb. 4, 2025

(54) MONOTERPENOID/PHENYLPROPANOID-CONTAINING COMPOUNDS AND METHODS OF THEIR MAKING AND USE AS HERBICIDES

(71) Applicants: KITTRICH CORPORATION, Pomona, CA (US); IOWA STATE UNIVERSITY RESEARCH FOUNDATION, INC., Ames, IA (US)

(72) Inventors: Joel R. Coats, Ames, IA (US); James S. Klimavicz, Ames, IA (US); Edmund J. Norris, Ames, IA (US); Steven M. Bessette, West Palm Beach, FL (US); A. David Lindsay, Denver, CO (US)

(73) Assignees: Kittrich Corporation, Pomona, CA (US); Iowa State University Foundation, Inc., Ames, IA (US)

( * ) Notice: Subject to any disclaimer, the term of this patent is extended or adjusted under 35 U.S.C. 154(b) by 1082 days.

(21) Appl. No.: 16/328,271

(22) PCT Filed: Aug. 23, 2017

(86) PCT No.: PCT/US2017/048290
§ 371 (c)(1),
(2) Date: Feb. 25, 2019

(87) PCT Pub. No.: WO2018/039390
PCT Pub. Date: Mar. 1, 2018

(65) Prior Publication Data
US 2023/0200386 A1 Jun. 29, 2023

Related U.S. Application Data

(60) Provisional application No. 62/378,541, filed on Aug. 23, 2016.

(51) Int. Cl.
| | | |
|---|---|---|
| A01N 25/00 | (2006.01) |
| A01N 37/06 | (2006.01) |
| A01N 37/10 | (2006.01) |
| A01N 37/38 | (2006.01) |
| A01N 39/04 | (2006.01) |
| A01N 43/16 | (2006.01) |
| A01P 13/02 | (2006.01) |

(52) U.S. Cl.
CPC ............. *A01N 25/00* (2013.01); *A01N 37/06* (2013.01); *A01N 37/10* (2013.01); *A01N 37/38* (2013.01); *A01N 39/04* (2013.01); *A01N 43/16* (2013.01); *A01P 13/02* (2021.08)

(58) Field of Classification Search
CPC ...................................................... A01N 39/04
See application file for complete search history.

(56) References Cited

FOREIGN PATENT DOCUMENTS

JP          3-48674       *    3/1991

OTHER PUBLICATIONS

Derwent abstract of JP 3-48674 (Mar. 1991).*
JPO abstract of JP 3-48674 (Mar. 1991).*
Weintraub, R. et al., "Relation between molecular structure and physiological activity of plant growth regulators II. Formative activity of phenoxyacetic acids," Agricultural and Food Chemistry, vol. 2, pp. 996-999 (1954).*
Aberg, B., "Studies on plant growth regulators. IX. Para-alkyl-phenoxy-acetic and -propionic acids, and some related derivatives of naturally occurring phenols," Physiologia Plantarum, vol. 7 (2), pp. 241-252 (1954).*
Introduction to Weeds and Herbicides, Penn State Cooperative Extension, College of Agricultural Sciences, pp. 1-28 (2013).*
Barbosa, J.D.F. et al., "Structure-activity relationships of eugenol derivatives against Aedes aegypti (Diptera:Culicidae) larvae," Pest Management Science, vol. 68(11), pp. 1478-1483 (2012).*

* cited by examiner

*Primary Examiner* — John Pak
(74) *Attorney, Agent, or Firm* — Hudak, Shunk & Farine Co. LPA

(57) ABSTRACT

Disclosed are compounds having a monoterpenoid and/or phenylpropanoid moiety and methods of their making and use as pesticidal compounds, such as herbicides.

6 Claims, 8 Drawing Sheets

1% carvacryloxyacetic acid   1% 2,4-dichlorophenoxyacetic acid carvacryloxyacetic acid    thymyloxyacetic acid wood sorrel soybean corn

MONOTERPENOID/PHENYLPROPANOID-CONTAINING COMPOUNDS AND METHODS OF THEIR MAKING AND USE AS HERBICIDES

CROSS-REFERENCE TO RELATED APPLICATIONS

This patent application claims the benefit of U.S. Provisional Patent Application No. 62/378,541, filed Aug. 23, 2016. The entire disclosures of the above-identified prior provisional patent application and all other concurrently filed non-provisional patent applications claiming the benefit from the provisional application are incorporated herein by reference.

BACKGROUND OF THE INVENTION

The disclosed embodiments relate to compounds having a monoterpenoid and/or phenylpropanoid moiety and methods of their making and use.

Many plant essential oils contain monoterpene or monoterpenoid compounds, some of which are insecticidal. Their potency is typically less than for conventional synthetic insecticides, but they are just as effective at causing insect mortality or control when a sufficient dose is delivered to the pest.

Monoterpenoids have been demonstrated to possess various properties that allow them to manipulate various biological systems. These compounds have been demonstrated to be insecticidal, bactericidal, fungicidal, and herbicidal. The utility of select derivatives of monoterpenoids as potential herbicides are disclosed herein. These compounds kill plants via other mechanisms than those described in other patents that describe the utility of monoterpenoids as herbicides. Moreover, these compounds are selective toward dicotyledon species of plants, which makes their utility and value in the current market significant.

The disclosed embodiments are believed to overcome one or more deficiencies in the art.

SUMMARY OF THE INVENTION

One aspect of the disclosed embodiments relates to a compound of formula (I):

$R_1$-A, wherein A is:

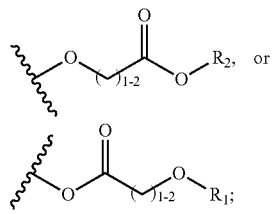

$R_1$ is a phenylpropanoid or monoterpenoid moiety;
R2 is a phenylpropanoid or monoterpenoid moiety or is selected from the group consisting of H, M, substituted or unsubstituted C3-C7 unbranched or branched alkyl, substituted or unsubstituted C2-C7 unbranched or branched alkenyl, substituted or unsubstituted C3-C7 unbranched or branched alkynyl, substituted or unsubstituted C3-C7 unbranched or branched cycloalkyl, substituted or unsubstituted heteroaryl, and substituted or unsubstituted C3-C7 unbranched or branched cycloalkenyl; and
M is a counterion selected from the group consisting of sodium, potassium, calcium, magnesium, iron, zinc, copper, and an amine;

According to an example embodiment, the principal monoterpenoid and phenylpropanoid molecules employed are thymol, eugenol, isoeugenol, geraniol, menthol, citronellol, geraniol, linalool, cinnamic alcohol, vanillic acid, syringic acid, and carvacrol. 2-(2-formylphenoxy) acetic acid, salicylic acid, methyl salicylate, ferulic acid, p-coumaric acid, umbelliferone, piceol are also relevant starting materials that are considered monoterpenoids in accordance with the disclosed embodiments.

The disclosed embodiments exhibit toxicity as systemic herbicides for killing or controlling unwanted vegetation, etc. Moreover, these herbicides are selective toward dicotyledon plant species and are effective against a wide variety of pest plant species. These compounds represent herbicidal chemistry that is less residual than currently available herbicides on the market. By utilizing natural compounds for the production of herbicidal compounds, safer pesticidal formulations may be brought to market.

DETAILED DESCRIPTION OF THE INVENTION

Figure 1:
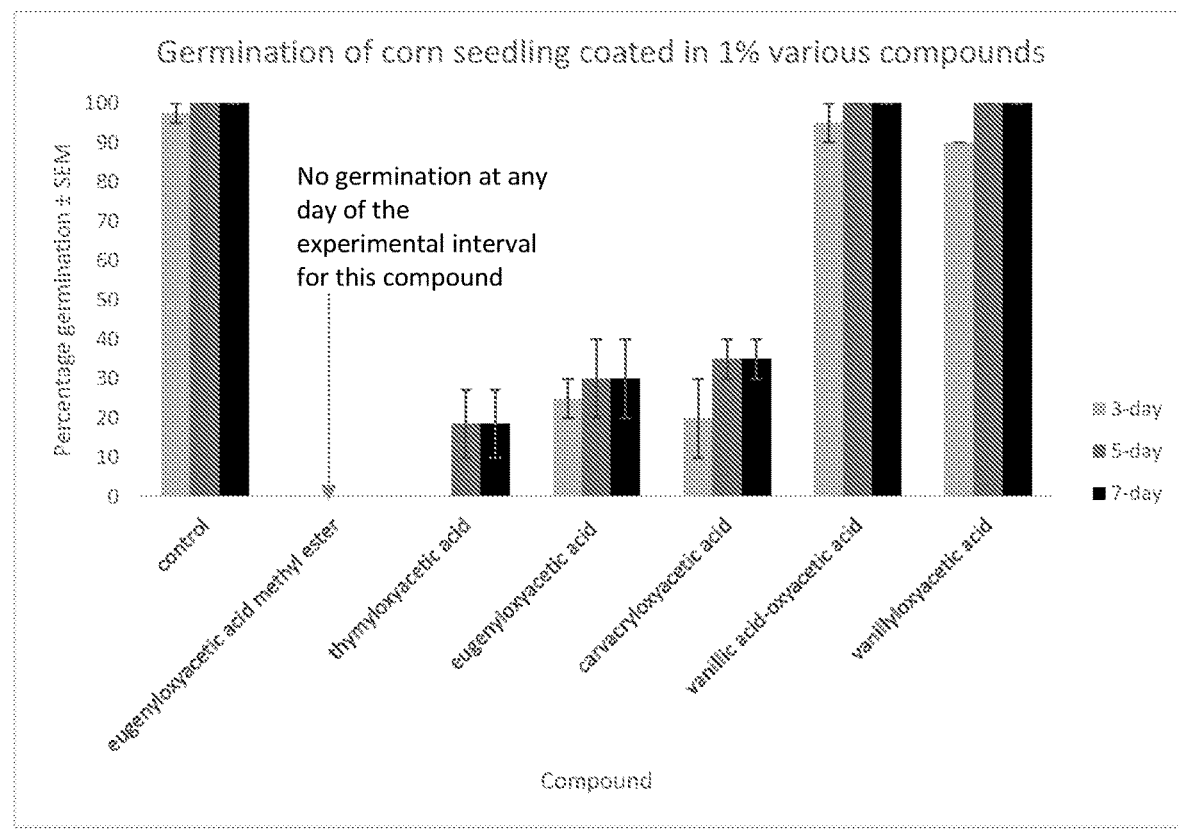
FIG. 1 is a graph demonstrating the efficacy of various monoterpenoid-oxyacetic acids to inhibit the germination of corn seeds treated with these compounds at a rate of 1% weight compound/weight seed. Numerous compounds were capable of inhibiting the germination of corn seedlings in this assay.
Figure 2:
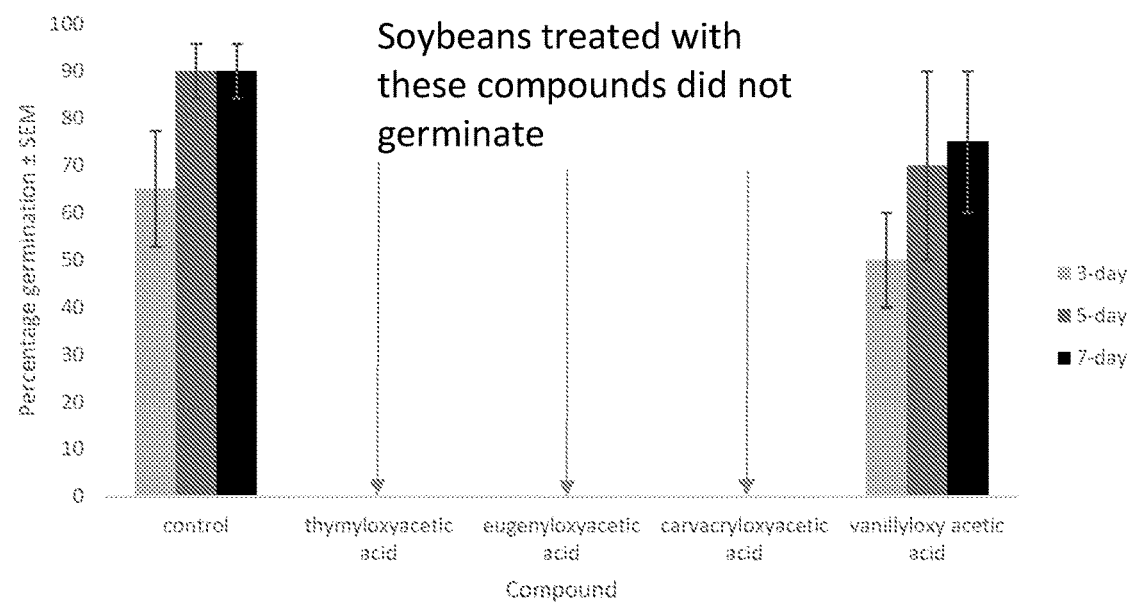
FIG. 2 is a graph demonstrating the efficacy of various compounds to inhibit the growth of soybeans coated in 1% weight compound/weight bean. Three compounds, thymyloxyacetic acid, eugenyloxyacetic acid, and carvacryloxyacetic acid, prevented the growth of soybeans in this assay. Vanillyloxyacetic acid is a representative compound that does not produce significant inhibition of plant growth when beans are treated with this compound.
Figure 3:
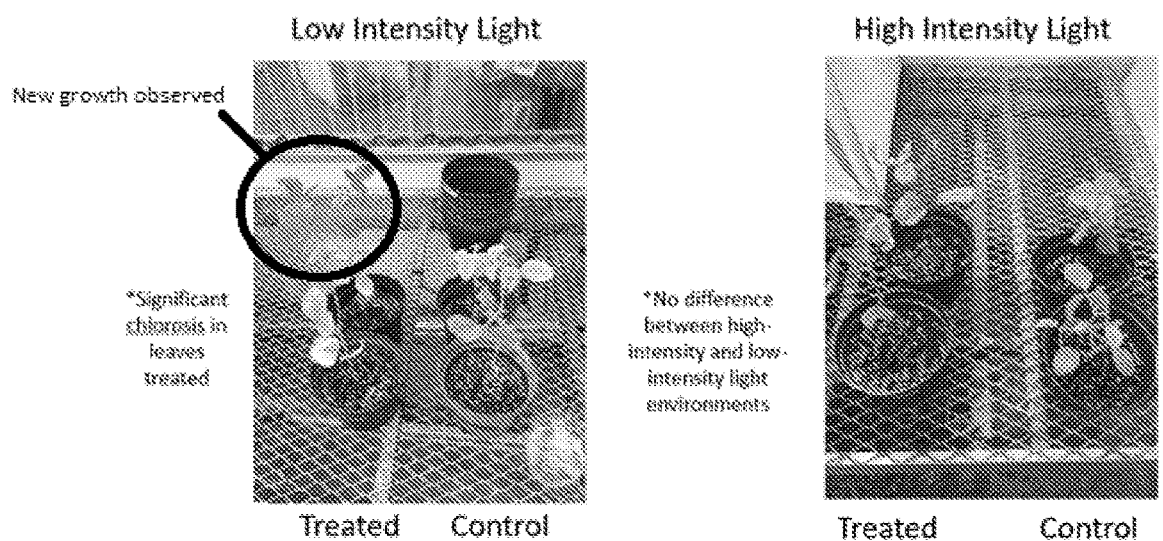
FIG. 3 is a representation of 1-month old soybean plants that have been exposed to a foliar spray of 1% thymyloxyacetic acid, 14 days after exposure. Treated plants exhibit signs of both significant chlorosis and wilting. It is possible that at higher concentrations of thymyloxyacetic acid, significant mortality could be achieved. There was no apparent differences in wilting and chlorosis between the high-intensity and low-intensity light groups, indicating that thymyloxyacetic acid exerts its phytotoxicity via a different mode of action than other terpenoids. New growth was observed in the low intensity light group. This is most likely due to the lack of light and not a consequence of the treatment. Control plants did not experience any negative effects associated with the high-intensity/low-intensity light environments.
Figure 4:
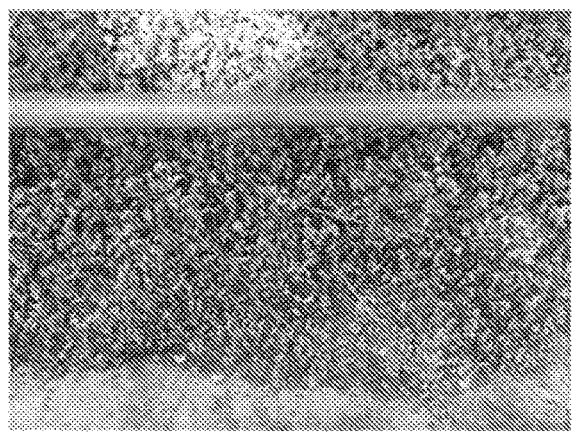
FIG. 4 Is a representation of wood sorrel treated with 20 sprays of 1% carvacryloxyacetic acid or 1% 2,4-dichlorophenoxyacetic acid from a MAINStays™ ironing spray bottle, observed 2 days after exposure. The 1% carvacryloxyacetic acid caused a more immediate phytotoxic effect than the 2,4-dichlorophenoxyacetic acid. Plants treated with 2,4-dichloroacetic acid at this rate experienced uncontrolled growth and some chlorosis. Carvacryloxyacetic acid caused immediate and widespread chlorosis followed by relatively quick plant death. Plants took much longer to die from 2,4-dichlorophenoxyacetic acid.
Figure 4:
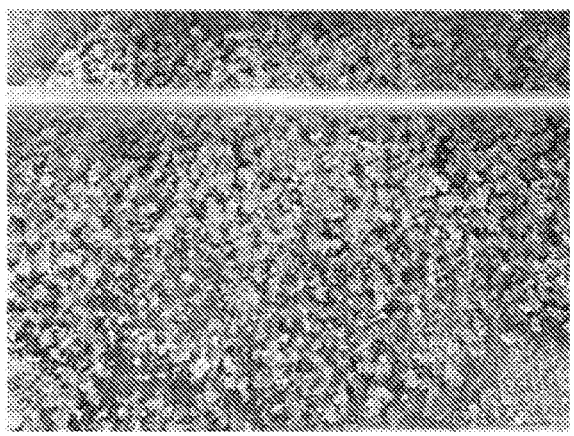
Figure 5:
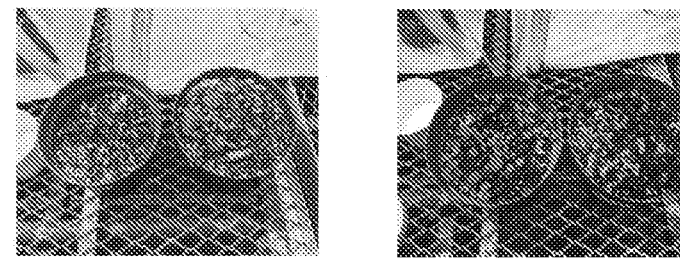
FIG. 5 is a representation of the pre-emergent application of thymyloxyacetic acid and carvacryloxyacetic acid 3-weeks after application. In each picture, the treated pot is featured on the left adjacent to the control (untreated) pot on the right. Both thymyloxyacetic acid and carvacryloxyacetic acid were capable of inhibiting the growth of both corn and soybeans when applied shortly after planting. Of the two formulations, carvacryloxyacetic acid outperformed thymyloxyacetic acid at inhibiting plant growth in both plant types. Soybeans and wood sorrel were completely prevented from growing at the 1% concentration of carvacryloxyacetic acid, suggesting this active ingredient may be an ideal pre-emergent herbicide. Moreover, this formulation caused significant inhibition in corn growth; however, corn plants still emerged and continued growing. Thymyloxyacetic acid caused a major inhibition of growth in both the soybean and wood sorrel at the beginning of the trial. However, treated wood sorrel experienced latent growth after the application, and plants in the treatment group may be larger than the control plants.
Figure 5:
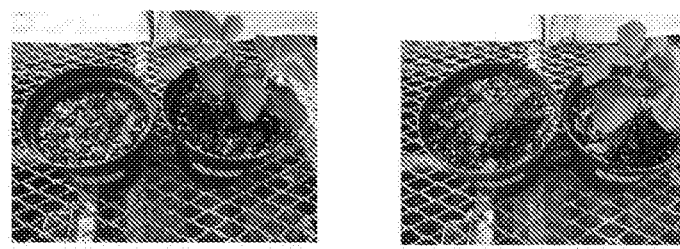
Figure 5:
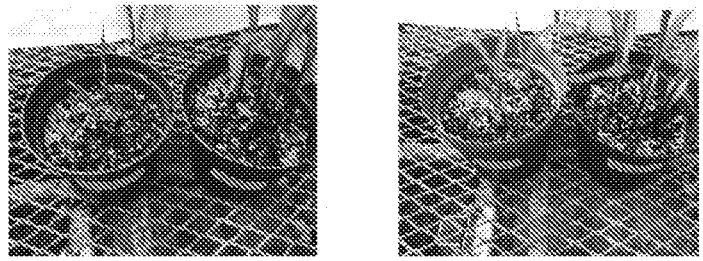
Figure 6:
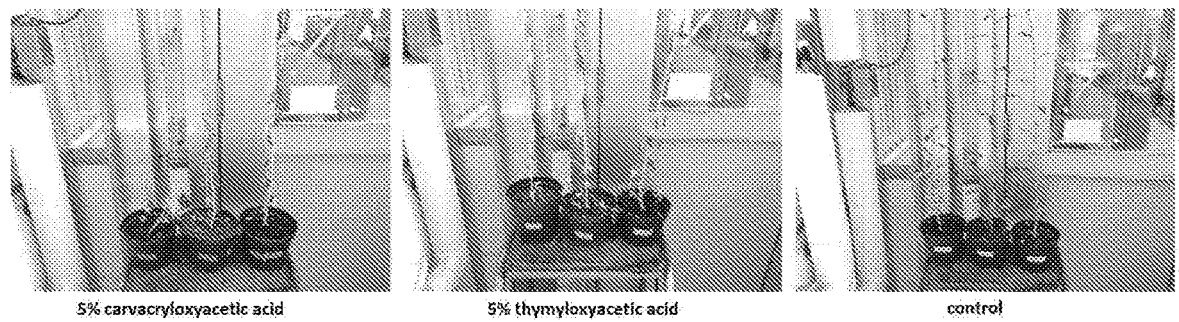
FIG. 6 is a representation of significant chlorosis and subsequent phytotoxicity that was observed in pigweed plants that were treated with 40 ml of 5% monoterpenoid derivatives. Both carvacryloxyacetic acid and thymyloxyacetic acid were capable of causing significant chlorosis and phytotoxicity in pigweed plants, 2 days after application.
Figure 7:
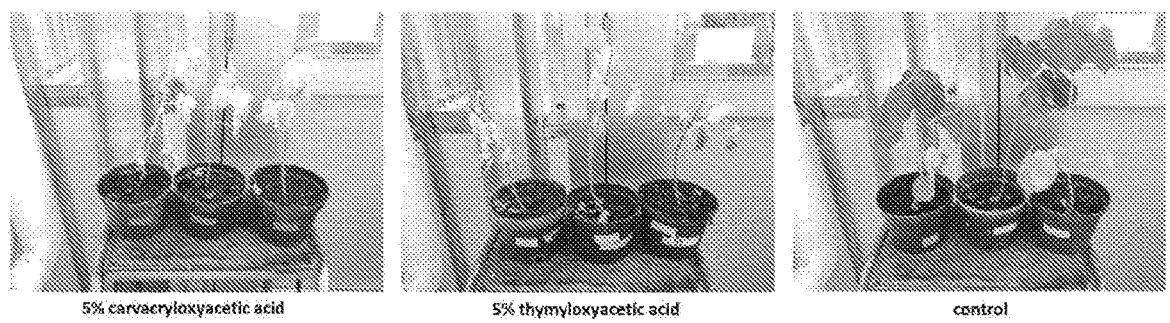
FIG. 7 is a representation of significant chlorosis and subsequent phytotoxicity that was observed in velvet leaf plants that were treated with 40 ml of 5% monoterpenoid derivatives. Both carvacryloxyacetic acid and thymyloxyacetic acid were capable of causing significant chlorosis and phytotoxicity in velvet leaf plants, 2 days after application.
Figure 8:
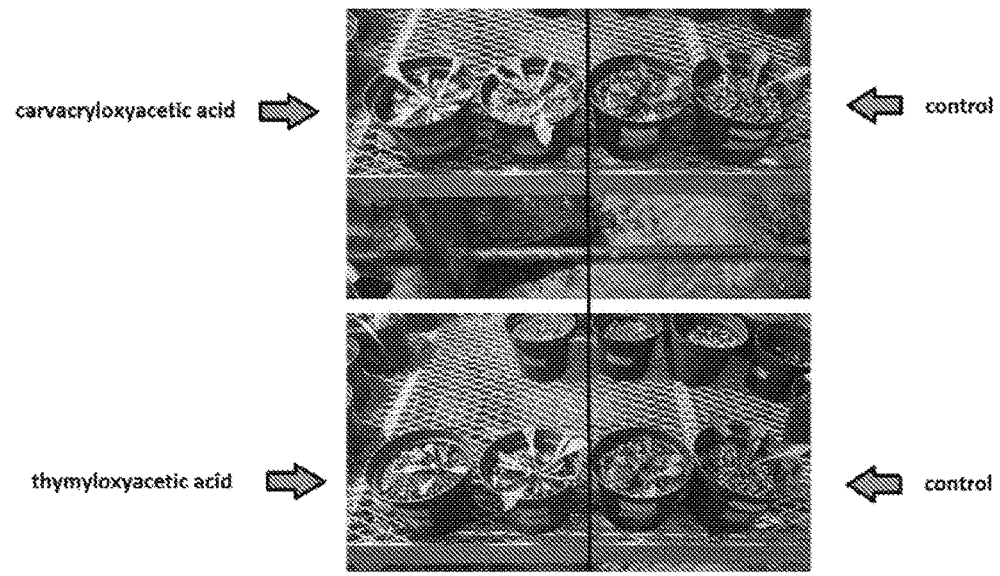
FIG. 8 is a representation of significant chlorosis and subsequent phytotoxicity that was observed in dandelions that were treated with 40 mL of 5% monoterpenoid derivatives. Both carvacryloxyacetic acid and thymyloxyacetic acid were capable of causing significant chlorosis and phytotoxicity in dandelions, 2 days after application.

The disclosed embodiments relates to compounds having a monoterpenoid and/or phenylpropanoid moiety, and methods use.

In particular, the disclosed embodiments relate to monoterpenoid and phenylpropanoid compounds derived from biorational sources. As discussed in more detail infra, the monoterpenoid and phenylpropanoid derivative compounds of the embodiments disclosed herein are particularly suited for use as pesticides, including as herbicides.

Throughout this disclosure, the following terms are provided for clarity.

As used herein, the term "monoterpenoid" refers to a monoterpene-like substance and is used to refer collectively to monoterpenoid derivatives as well as monoterpenoid analogs. By "monoterpene," it is meant a compound having a 10-carbon skeleton with non-linear branches. A monoterpene technically refers to a compound with two isoprene units connected in a head-to-end manner. Monoterpenoids can therefore include monoterpenes, alcohols, ketones, aldehydes, esters, ethers, acids, hydrocarbons without an oxygen functional group, and so forth. It is common practice to refer to certain phenolic compounds, such as eugenol, thymol, and carvacrol, as monoterpenoids because their function is essentially the same as a monoterpenoid. However, these compounds are not technically "monoterpenoids" (or "monoterpenes") because they are not synthesized by the same isoprene biosynthesis pathway, but rather by production of phenols from tyrosine. However, common practice will be followed herein.

The term "monoterpenoid alcohol" means any monoterpenoid or phenylpropanoid alcohol or phenol that occurs naturally, including, for example and without limitation: acyclic, unsaturated monoterpenoids, including citronellol, linalool, geraniol, nerol, and lavandulol; cyclic or bicyclic unsaturated monoterpenoids, including carveol, pinocarveol, myrcenol, myrtenol, α-terpineol, 4-terpeniol, verbenol, and perillyl alcohol; cyclic or polycyclic saturated monoterpenoids, including menthol, fenchol, borneol, isoborneol, and myrtanol; isopropyl cresols, including thymol, carvacrol, or 4-isopropyl-3-methylphenol; cycloheptatrienolones, such as any of the isomeric thujaplicins; phenylpropanoid alcohols or phenols, including eugenol, isoeugenol, cinnamyl alcohol, coniferyl alcohol, zingerone, umbelliferone, coumaryl alcohol, and chavicol; or alcohols or phenols produced by the natural plant metabolism of a phenylpropanoid, including vanillin, ethyl vanillin, piperonyl alcohol, or syringaldehyde.

Moreover, O-alkylated and O-acylated monoterpenoids, for example and without limitation etherified monoterpenoids containing carboxylic acid moieties or ester moieties and oligoesters of monoterpenoids containing carboxylic acid moieties are herein referred to as monoterpenoid derivatives.

The term "phenylpropanoid" refers to a diverse group of organic compounds that are synthesized by plants from the amino acid phenylalanine. Their name is derived from the six-carbon, aromatic phenyl group and the three-carbon propene tail of cinnamic acid, which is synthesized from phenylalanine in the first step of phenylpropanoid biosynthesis. Phenylpropanoids are found throughout the plant kingdom, where they serve as essential components of a number of structural polymers, provide protection from ultraviolet light, defend against herbivores and pathogens, and mediate plant-pollinator interactions as floral pigments and scent compounds.

According to one embodiment, the monoterpenoid and/or phenylpropanoid moiety of the compounds of the disclosed embodiments are derived from a biorational source, such as a plant volatile or as a constituent of plant essential oils obtained from the leaf tissue, stem tissue, root tissue, or mixture thereof.

As used herein, the term "alkyl" means an aliphatic hydrocarbon group which may be straight or branched. When not otherwise restricted, the term refers to an alkyl of from 2 to 7 carbons. Exemplary alkyl groups include, for example and without limitation, ethyl, n-propyl, i-propyl, n-butyl, t-butyl, n-pentyl, 3-pentyl, and the like.

The term "alkenyl" means an aliphatic hydrocarbon group containing a carbon-carbon double bond and which may be straight or branched having from 2 to about 7 carbon atoms in the chain. Non-limiting, exemplary alkenyl groups include ethenyl, propenyl, n-butenyl, isoprene, and i-butenyl. The term "alkenyl" may also refer to a hydrocarbon chain having 2 to 7 carbons containing at least one double bond and at least one triple bond.

The term "alkynyl" means an aliphatic hydrocarbon group containing a carbon-carbon triple bond and which may be straight or branched having about 3 to about 7 carbon atoms in the chain. Non-limiting, exemplary alkynyl groups include propynyl, n-butynyl, 2-butynyl, 3-methylbutynyl, propargyl, and n-pentynyl.

The term "cycloalkyl" means a non-aromatic, saturated or unsaturated, mono- or multi-cyclic ring system of about 3 to about 7 carbon atoms. Exemplary cycloalkyl groups include, without limitation, cyclopropyl, cyclobutyl, cyclopentyl, cyclohexyl, and cycloheptyl.

The term "cycloalkenyl" means a non-aromatic, unsaturated, mono- or multi-cyclic ring system of about 3 to about 7 carbon atoms. Exemplary cycloalkenyl groups include, without limitation, cyclopropenyl, cyclobutenyl, cyclopentenyl, cyclohexenyl, and cycloheptenyl.

The term "heteroaryl" means an aromatic monocyclic or multi-cyclic ring system of about 5 to about 19 ring atoms, or about 5 to about 10 ring atoms, in which one or more of the atoms in the ring system is/are element(s) other than carbon, for example, nitrogen, oxygen, or sulfur. In the case of a multi-cyclic ring system, only one of the rings needs to be aromatic for the ring system to be defined as "heteroaryl." Particular heteroaryls contain about 5 to 6 ring atoms. The prefix aza, oxa, thia, or thio before heteroaryl means that at least a nitrogen, oxygen, or sulfur atom, respectively, is present as a ring atom. A nitrogen, carbon, or sulfur atom in the heteroaryl ring may be optionally oxidized; the nitrogen may optionally be quaternized. Suitable heteroaryls include, without limitation, pyridyl, 2-oxo-pyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3] dioxolyl, quinolinyl, isoquinolinyl, quinazolinyl, cinnolinyl, pthalazinyl, quinoxalinyl, 2,3-dihydro-benzo[1,4]dioxinyl, benzo[1,2,3]triazinyl, benzo[1,2,4]triazinyl, 4H-chromenyl, indolizinyl, quinolizinyl, 6aH-thieno[2,3-d] imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5] oxadiazolyl, benzo[c][1,2,5] thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2 (3H)-yl, and the like.

The term "monocyclic" used herein indicates a molecular structure having one ring.

The term "polycyclic" or "multi-cyclic" used herein indicates a molecular structure having two or more rings, including, but not limited to, fused, bridged, or spiro rings.

The term "substituted" specifically envisions and allows for one or more substitutions that are common in the art. However, it is generally understood by those skilled in the art that the substituents should be selected so as to not adversely affect the useful characteristics of the compound or adversely interfere with its function. Suitable substituents may include, for example, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, amino groups, alkyl- and dialkylamino groups, carbamoyl groups, alkylcarbonyl groups, carboxyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups, cycloalkyl groups, cyano groups, C1-C6 alkylthio groups, arylthio groups, nitro groups, keto groups, acyl groups, boronate or boronyl groups, phosphate or phosphonyl groups, sulfamyl groups, sulfonyl groups, sulfinyl groups, and combinations thereof. In the case of substituted combinations, such as "substituted arylalkyl," either the aryl or the alkyl group may be substituted, or both the aryl and the alkyl groups may be substituted with one or more substituents. Additionally, in some cases, suitable substituents may combine to form one or more rings as known to those of skill in the art.

According to one embodiment, the compounds are substituted, meaning a group may have a substituent at a substitutable atom of the group (including more than one substituent on a single atom), provided that the designated atom's normal valence is not exceeded and the identity of each substituent is independent of the others. For example, up to three H atoms in each residue are replaced with substituents such as alkyl, hydroxy, lower alkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. When a substituent is keto (i.e., =O), then two hydrogens on the atom are replaced. Combinations of substituents and/or variables are permissible only if such combinations result in stable compounds; by "stable compound" it is meant a compound that is sufficiently robust to survive isolation to a useful degree of purity from a reaction mixture, and formulation into an agent intended for a suitable use.

According to certain embodiments, the compounds are unsubstituted. "Unsubstituted" atoms bear all of the hydrogen atoms dictated by their valence.

The term "compound," and equivalent expressions, are meant to embrace compounds as described herein. Also contemplated are salts, oxides, solvates, e.g., hydrates, and inclusion complexes of the compounds, where the context so permits, as well as any stereoisomeric form, or a mixture of any such forms of that compound in any ratio. Inclusion complexes are described in Remington, The Science and Practice of Pharmacy, 19th Ed. 1:176-177 (1995), which is hereby incorporated by reference in its entirety. The most commonly employed inclusion complexes are those with cyclodextrins, and all cyclodextrin complexes, natural and synthetic, are specifically encompassed by the compounds disclosed herein.

Compounds described herein may contain one or more asymmetric centers and may thus give rise to enantiomers, diastereomers, and other stereoisomeric forms. Each chiral center may be defined, in terms of absolute stereochemistry, as (R)- or (S)-. This is meant to include all such possible isomers, as well as mixtures thereof, including racemic and optically pure forms. Optically active (R)- and (S)-, (−)- and (+)-, or (D)- and (L)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

One aspect of the disclosed embodiments relates to a compound of formula (I):

R₁-A wherein A is:

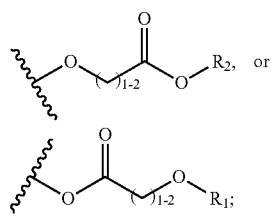

R₁ is a phenylpropanoid or monoterpenoid moiety;
R₂ is a substituted or unsubstituted phenylpropanoid or monoterpenoid moiety or is selected from the group consisting of H, M, substituted or unsubstituted C3-C7 unbranched or branched alkyl, substituted or unsubstituted C2-C7 unbranched or branched alkenyl, substituted or unsubstituted C3-C7 unbranched or branched alkynyl, substituted or unsubstituted C3-C7 unbranched or branched cycloalkyl, substituted or unsubstituted heteroaryl, and substituted or unsubstituted C3-C7 unbranched or branched cycloalkenyl; and
M is a counterion selected from the group consisting of sodium, potassium, calcium, magnesium, iron, zinc, copper, and an amine;

In one embodiment of the compound of formula (I), R₂ is H.

In another embodiment of the compound of formula (I), A is

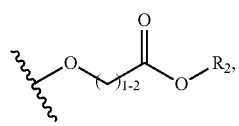

the carbon in the parentheses is 1, and R₂ is H.

In yet another embodiment of the compound of formula (I), R₂ is C₃-C₇ branched alkyl selected from the group consisting of

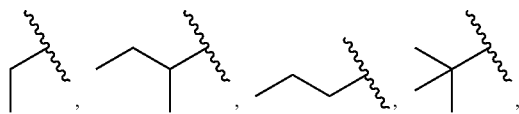

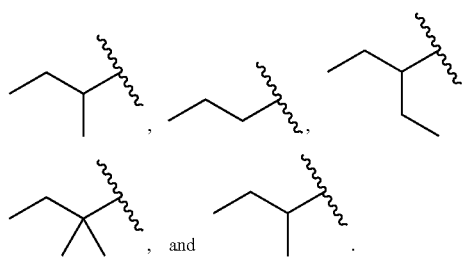

In another embodiment of the compound of formula (I), R₂ is C2-C7 unbranched or branched alkenyl selected from the group consisting of

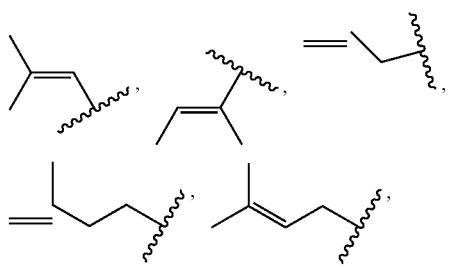

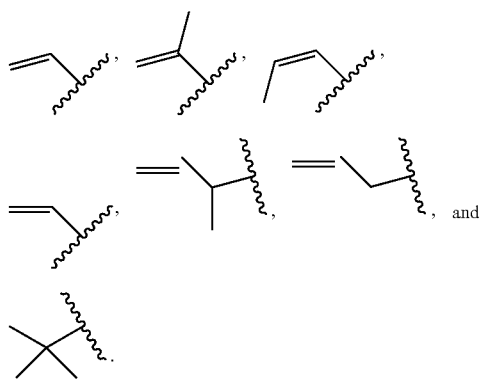

In another embodiment of the compound of formula (I), R₂ is C3-C7 unbranched or branched alkynyl selected form the group consisting of

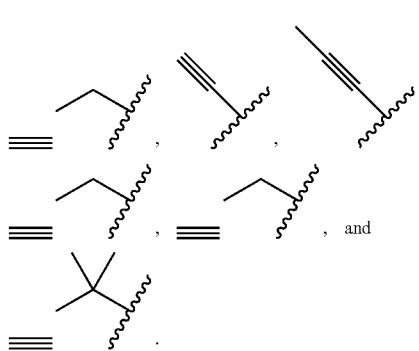

In another embodiment of the compound of formula (I), R₂ is C3-C7 unbranched or branched cycloalkyl selected form the group consisting of

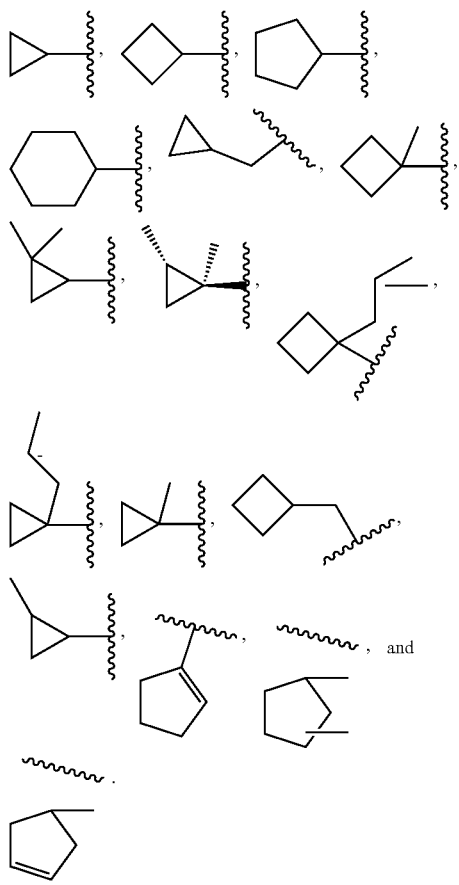

In another embodiment of the compound of formula (I), $R_2$ is:

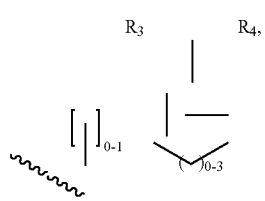

where $R_3$ and $R_4$ are independently selected from the group consisting of H, methyl, ethyl, propyl, isopropyl, vinyl, allyl, and propargyl.

In more specific embodiments, $R_3$ and $R_4$ are both H; $R_3$ and $R_4$ are both CH3; $R_3$ is CH3 and $R_4$ is H; or $R_3$ is allyl and $R_4$ is H.

In another embodiment of the compound of formula (I), $R_2$ is:

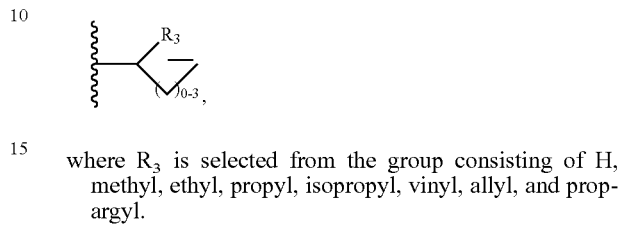

where $R_3$ is selected from the group consisting of H, methyl, ethyl, propyl, isopropyl, vinyl, allyl, and propargyl.

In another embodiment of the compound of formula (I), $R_1$ is a phenypropanoid moiety.

In yet another embodiment of the compound of formula (I), $R_1$ is a monoterpenoid moiety.

In a more specific embodiment, the monoterpenoid moiety is selected from the group consisting of

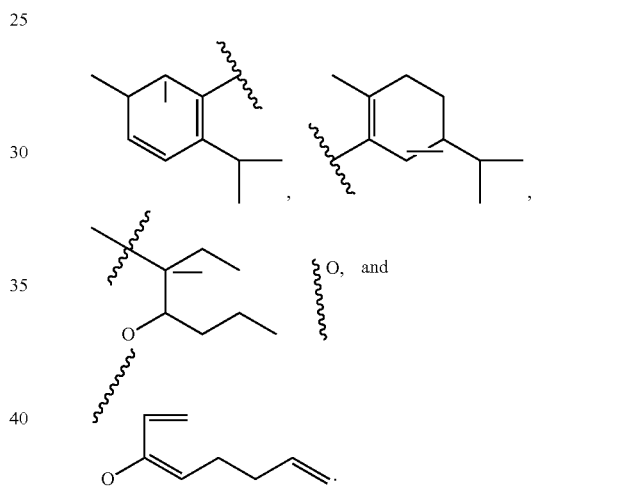

In another embodiment of the compound of formula (I), $R_2$ is selected from the group consisting of methyl, ethyl, isopropyl, propyl, isobutyl, butyl, and tert-butyl.

Compounds of formula (I) include, without limitation, the specific compounds set forth in the following Table 1.

| Compound Name | Compound Structure |
|---|---|
| 123B carvacrol eugenyloxyacetate | |

-continued

| | Compound Name | Compound Structure |
|---|---|---|
| 2016 | geranyl thymyloxyacetate | |
| 106 | thymyloxyacetic acid | |
| 109 | eugenyloxyacetic acid | |
| 2283 | ethyl thymyloxyacetate | |
| 2283 | ethyl carvacryloxyacetate | |
| 2288A | isopropyl carvacryloxyacetate | |
| 2289 | amyl thymyloxyacetate | |

| Compound Name | Compound Structure |
|---|---|
| Thymyloxyacetic acid (2-(2-isopropyl-5-methylphenoxy)acetic acid) | |
| Carvacryloxyacetic acid (2-(5-isopropyl-2-methylphenoxy)acetic acid) | |
| Eugenyloxyacetic acid (2-(4-allyl-2-methoxyphenoxy)acetic acid) | |
| Vanillyloxyacetic acid (2-(4-formyl-2-methoxyphenoxy)acetic acid) | |
| Carboxymethylvanillic acid (4-(carboxymethoxy)-3-methoxybenzoic acid) (from vanillic acid) | |
| Salicyloxyacetic acid (2-(2-formylphenoxy)acetic acid) | |
| Carboxymethylsalicylic acid (2-(carboxymethoxy)benzoic acid) (from salicylic acid) | |
| 2-(2-(methoxycarbonyl)phenoxy)acetic acid (from methyl salicylate) | |

| Compound Name | Compound Structure |
|---|---|
| 3-(4-(carboxymethoxy)-3-methoxyphenyl) acrylic acid (from ferulic acid) | |
| 3-(4-(carboxymethoxy)phenyl)acrylic acid (from p-coumaric acid) | |
| coumarin-7-oxyacetic acid (2-((2-oxo-2H-chromen-7-yl)oxy)acetic acid) (from umbelliferone) | |
| 2-(4-acetylphenoxy)acetic acid (from piceol/4'-hydroxyacetophenone) | |

According to one embodiment, compounds of formula (I) that have a free carboxylic acid can have each acid esterified, or the carboxylic acid can be used to form a carboxylate salt.

In one embodiment, compounds of formula (I) include the specific structures identified in Table 3 other than thymyloxyacetic acid, carvacryloxyacetic acid, and eugenyloxyacetic acid.

As noted supra, the certain example compounds may be derived from a biorational source, such as a plant volatile or as a constituent of plant essential oils obtained from the leaf tissue, stem tissue, root tissue, or mixture thereof.

As noted supra, certain compounds are derivatives of monoterpenoids or phenylpropanoids. By way of a non-limiting example, a compound of the present disclosure may be a derivative of an alcohol-containing monoterpenoid or phenylpropanoid, such as, e.g., thymol

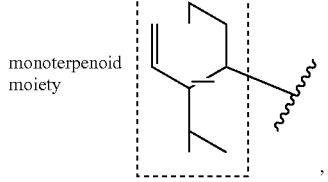

where the 10-carbon skeleton of thymol makes up the monoterpenoid or monoterpenoid moiety (e.g., $R_1$ of formula (I)), and the wavy line, , represents the linkage to the rest of the molecule.

By way of another non-limiting example, a compound may be a derivative of a carboxylic acid-containing monoterpenoid or phenylpropanoid, such as, e.g., citronellic acid

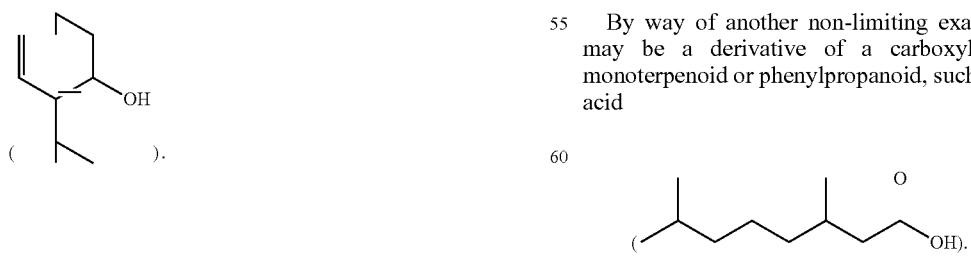

In one example embodiment, a thymol-derivative has the structure

In another example embodiment, a citronellic acid derivative has the structure

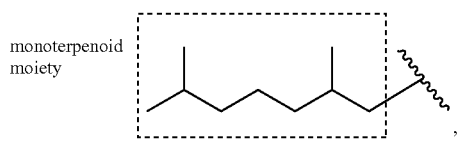 [SMILES: *CC(C)CCCC(C)C]

where the 9-carbon skeleton of citronellic acid (excluding the carboxylic acid carbon) makes up the monoterpenoid or monoterpenoid moiety and the wavy line, ⁓, represents the linkage to the rest of the molecule.

Thus, the example compounds may be derived from monoterpenoid alcohols (i.e., monoterpenoids containing a hydroxyl group) or from monoterpenoid carboxylic acids (i.e., monoterpenoids containing a carboxylic acid). Alternatively, the compounds may be derived from phenylpropanoid alcohols (i.e., phenylpropanoids containing a hydroxyl group) or from phenylpropanoid carboxylic acids (i.e., phenylpropanoids containing a carboxylic acid).

A further aspect of the disclosed embodiments relates to an herbicidal composition comprising the compounds of formula (I) and a carrier.

In one embodiment, the herbicide composition comprises a subsect of compounds of formula (I) and a carrier. For example, and without limitation, the herbicide composition comprises a compound of formula (I), where A is

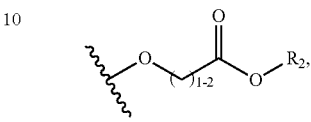

the carbon in the parentheses is 1, and $R_2$ is H.

In a more specific embodiment, compounds useful in the herbicidal composition include, without limitation, any one or more of the exemplary compounds set forth in the following Table 2.

| Compound Name | Compound Structure |
|---|---|
| Thymyloxyacetic acid (2-(2-isopropyl-5-methylphenoxy)acetic acid) | |
| Carvacryloxyacetic acid (2-(5-isopropyl-2-methylphenoxy)acetic acid) | |
| Eugenyloxyacetic acid (2-(4-allyl-2-methoxyphenoxy)acetic acid) | |
| Vanillyloxyacetic acid (2-(4-formyl-2-methoxyphenoxy)acetic acid) | |
| Carboxymethylvanillic acid (4-(carboxymethoxy)-3-methoxybenzoic acid) (from vanillic acid) | |
| Salicyloxyacetic acid (2-(2-formylphenoxy)acetic acid) | |

| Compound Name | Compound Structure |
|---|---|
| Carboxymethylsalicylic acid (2-(carboxymethoxy)benzoic acid) (from salicylic acid) | |
| 2-(2-(methoxycarbonyl)phenoxy)acetic acid (from methyl salicylate) | |
| 3-(4-(carboxymethoxy)-3-methoxyphenyl)acrylic acid (from ferulic acid) | |
| 3-(4-(carboxymethoxy)phenyl)acrylic acid (from p-coumaric acid) | |
| coumarin-7-oxyacetic acid (2-((2-oxo-2H-chromen-7-yl)oxy)acetic acid) (from umbelliferone) | |
| 2-(4-acetylphenoxy)acetic acid (from piceol/4'-hydroxyacetophenone) | |

The herbicide compounds identified in Table 2 are indicated as free carboxylic acids. However, each acid can be esterified or used to form a carboxylate salt.

In a specific embodiment, suitable esters include, without limitation, methyl, ethyl, propyl, isopropyl, butyl, isobutyl, sec-butyl, tert-butyl, amyl esters.

In another specific embodiment, suitable carboxylate salts include, without limitation, metal salts, including sodium, potassium, calcium, and magnesium.

In yet another specific embodiment, suitable herbicide compounds are diacids, including diesters and divalent anionic salts.

Herbicidal compositions (phytotoxic and/or systemic) may be applied as a pre- or post-emergent application to herbs, such as weeds, to control their growth.

As used herein, the term "phytotoxic" or "phytotoxicant" or "phytotoxicity" denotes materials that (1) effectively control all plants in a given locus or (2) selectively control the growth of one or more plant species in the presence of other plants. These Interchangeable terms are also used to identify the overall and selective control activity of certain compounds and compositions disclosed herein.

As used herein, the term "systemic" denotes herbicidal compounds or compositions that are assimilated by susceptible vegetation and are then translocated to parts of the plant other than those contacted. A systemic herbicide generally, if not always, depends on a translocation mode of action for their herbicidal activity. For instance, when applied to plant foliage, the systemic herbicides disclosed herein will be assimilated during transpiration, or otherwise, and transported throughout the entire plant so that it eliminates the undesired vegetation, roots, and all.

Contact herbicidal activity provides immediate vegetation control while the systemic herbicidal mode of action may more desirably reduce treatment cost, improve vegetation control, reduce both immediate and residual toxic effects to humans and animals, and reduce the possibility of herbicide residue on harvested food crops. Immediate vegetation control is defined as phytotoxicity that occurs within the first few hours or days (e.g. 1-3 days) after treating the plant tissue. This is markedly different from the relatively slower activity of 2,4-dichlorophenoxyacetic acid.

The term "control" as used herein is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The herbicidal compositions and methods disclosed herein may exhibit accentuated pre- and post-emergent, systemic herbicidal activity with the result that significantly smaller dosages of a given herbicide may be applied to achieve the same degree of vegetation control or, alternatively, a higher degree of vegetation control is achieved with the same application rate. These herbicidal compositions and methods may also provide contact herbicidal properties and, at the same time, provide nitrogen and sulfur nutrients for the desirable plants. They may also enable the use of systemic herbicides in combination with other conventional herbicidal compounds.

Application of the herbicidal compositions of the disclosed embodiments may be carried out by foliar spray, soil drench (pre- and post-emergence), powder application, and granule application with and without substrate, for both broadleaf weeds and grasses. An effective amount for phytotoxic or systemic control is that amount necessary for overall or selective control, i.e., a phytotoxic or herbicidal amount. A person of ordinary skill in the art can readily determine from the teachings of this specification, including the examples, suitable approximate application rate(s).

It will be understood by all readers of this written description that the example embodiments described herein and claimed hereafter may be suitably practiced in the absence of any recited feature, element or step that is, or is not, specifically disclosed herein. For instance, references in this written description to "one embodiment," "an embodiment," "an example embodiment," and the like, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to affect such feature, structure, or characteristic in connection with other embodiments whether or not explicitly described.

All publications and references cited herein, including those in the Background section, are expressly incorporated herein by reference in their entirety. However, if there are any differences between any similar or identical terms found an incorporated publication or reference and those explicitly put forth or defined in this written description, then those terms definitions or meanings explicitly put forth in this written description shall control in all respects. Further, any reference to prior art in this specification is not, and should not be taken as, an acknowledgment or any form of suggestion that such prior art forms part of the common general knowledge in any country.

EXAMPLES

The following examples are provided to illustrate embodiments but they are by no means intended to limit its scope.

Example 1—Germination Assays

Materials and Methods

Soybeans

Soybeans originally obtained were untreated and did not contain any form of pesticide coating. Soybeans were susceptible to *Aphis glycines* infestation and were not determined to be a biotype that was resistant to infestation, which could confide results. Germination typically occurred between 3-5 days after moistening.

Corn Seeds

Corn seeds obtained were untreated and did not contain any form of pesticide coating. Corn seeds used were a non-transgenic type strain of corn in order to prevent confounding results. Germination typically occurred between 2-4 days after moistening.

Germination Assessment

Seed Coating (Solid Compounds)

Seed coating was accomplished by placing 20 g of corn seeds or soybeans into a container with approximately 1 mL of a 1:5 Elmer's Glue®:water solution (or a different adhesive:water mixture) with a small amount of Triton-X 100™ (present 100 µL/5 ml). For solid compounds, 0.25 g of compound was subsequently introduced into the container. This mixture of seeds, Elmer's Glue/water/Triton-X 100™ solution, and active compound was mixed thoroughly until seeds were coated with the active ingredient.

Seed Coating (Liquid Compounds)

For each treatment, 0.25 g of liquid compound was dissolved in 5 mL of hexane. 0.25 g of Hi-Sil 233 Silica gel was introduced into this mixture of hexane and active ingredient. The solvent was removed using a rotary evaporator, allowing for the compound to adsorb to the silica gel. This 0.5 g of silica gel:active ingredient was then used as the solid material used for coating the seeds. The seeds were then coated with the same method used for solid compound.

Germination Assays

Ten soybeans or corn seeds were introduced into 1-pint regular mouth mason jars (Kerr®) surrounded by paper towels that were coated with 10 ml of water (minimum amount necessary to drench the paper towel). Soybeans or corn seeds were grouped together and paper towels were folded twice to allow for continual exposure to moisture. After the introduction of soybeans or corn seeds, mason jars were sealed with Mason jar lids for the entirety of the experiment to prevent desiccation and to provide a continually moist environment for soybeans and corn seeds. Germination was defined as the extrusion of the radicle from the seed coat. Plants were grown at ambient room temperature and in a 12 hr:12 hr light:dark cycle. Beans/seeds were removed periodically throughout the experiment in order to observe the number of radicles clearly visible at 3, 5, and 7 days after the introduction of beans/seeds. After each observation, seeds/beans were reintroduced into the moist paper towel and mason jar which was then sealed. Each treatment was replicated twice, and the average percentage germination and standard error was reported for each time point and treatment.

Results

Figure 9:
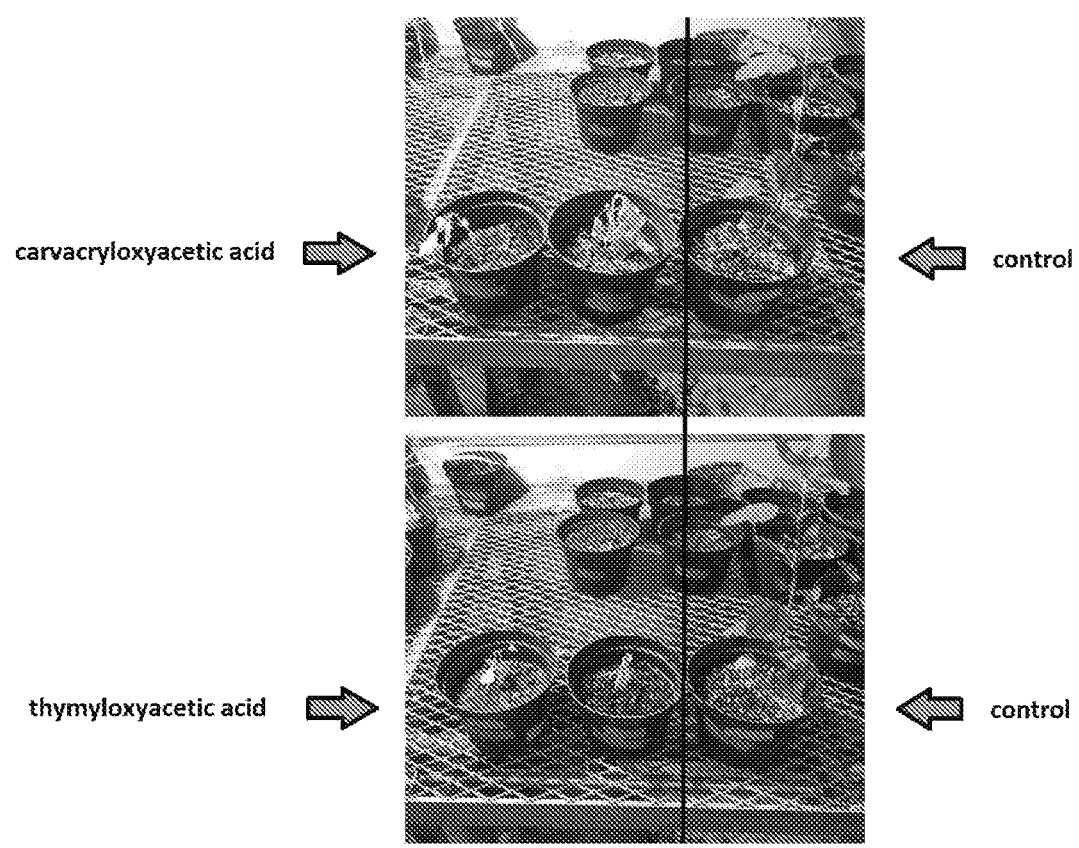
FIG. 9 is a representation of significant chlorosis and subsequent phytotoxicity that was observed in lamb's quarters plants that were treated with 40 ml of 5% monoterpenoid derivatives. Both carvacryloxyacetic acid and thymyloxyacetic acid were capable of causing significant chlorosis and phytotoxicity in lamb's quarters, two days after application.

All compounds tested caused inhibition of seed/bean germination at 3, 5, and 7-days after introducing seeds/beans into the moist paper towel. These data suggest the potential of these components as herbicides, particularly herbicides applied prior to emergence. Moreover, monocots seemed to be less susceptible to the inhibitory effects on germination caused by these compounds than dicots (corn vs. soybean). It is possible that these compounds may exert their effects in a selective manner, with dicots being more susceptible than monocots Corn seed germination was significantly inhibited by all compounds screened except for vanillyloxyacetic acid and vanillic acid-oxyacetic acid (FIG. 9). Of the compounds that produced significant inhibition of seed germination, eugenyloxyacetic acid methyl ester was the most capable of inhibiting the growth of corn seeds. This may indicate the increased potential of this compound to be used in future herbicidal formulations. The other compounds were capable of significantly reducing the number of seeds germinating and also delayed the germination of seeds in some instances. Thymyloxyacetic acid was capable of causing the second most significant inhibition compared to eugenyl oxyacetate methyl ester and prevented any germination at day 3. Both eugenyloxyacetic acid and carvacryloxy acetic acid were capable of some level of germination at day 3. All compounds caused significant inhibition compared to the control and all prevented germination below an average percentage germination of 35%. The control by contrast caused 100% germination by day 7 in this assay.

Figure 10:
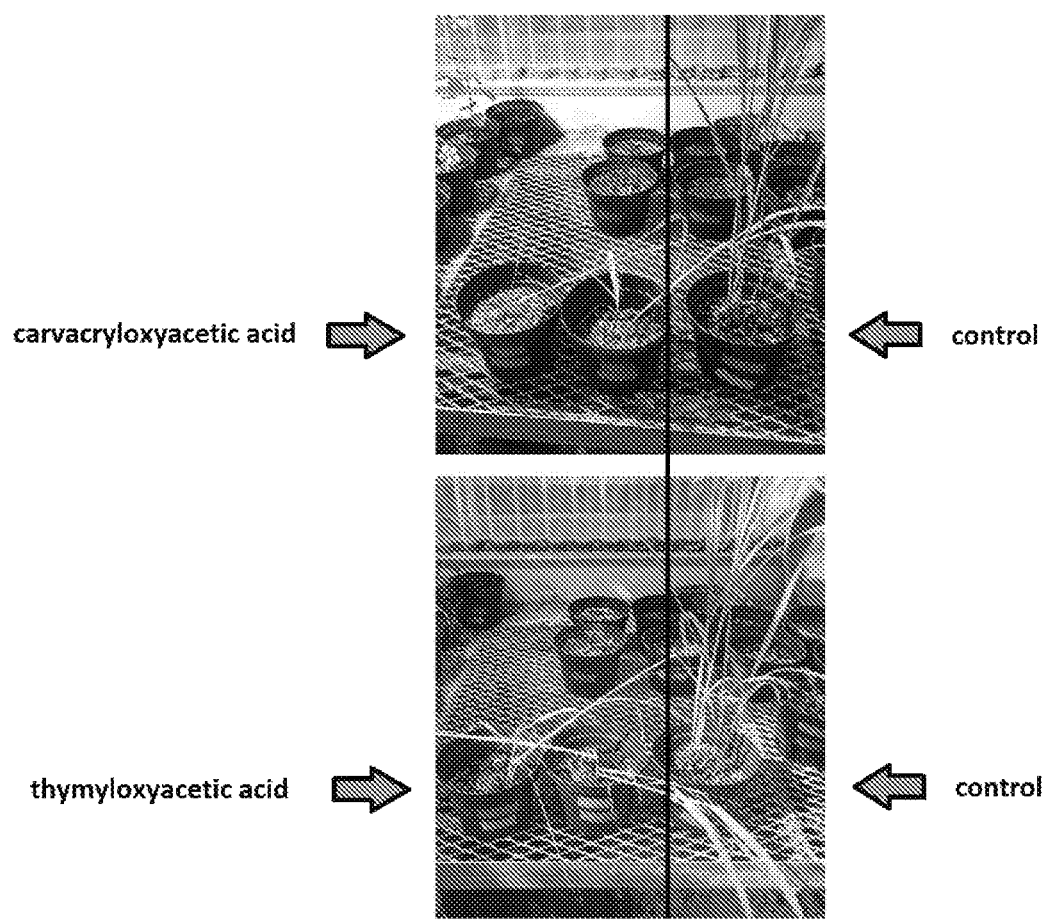
FIG. 10 is a representation of significant chlorosis and subsequent phytotoxicity that was observed in giant foxtail plants that were treated with 40 mL of 5% monoterpenoid derivatives. Both carvacryloxyacetic acid and thymyloxyacetic acid were capable of causing significant chlorosis and phytotoxicity in giant foxtail, 2 days after application.

Soybeans did not sprout in the presence of all of the active ingredients tested in this exploration, except for vanillyloxyacetic acid which produced little to no inhibitory effect (FIG. 10). Moreover, the inhibition of soybean seed germination was more pronounced than the inhibitory effect observed in the corn seedling exploration. This partial selectivity in controlling dicots to a higher degree than monocots may indicate its similarity to currently used herbicides on the market today. This selectivity may be utilized for the control of various weeds in gardens or in agricultural fields without harming various monocot plants (grass and corn).

Example 2—Soil Drench

Materials and Methods

Soybeans

Soybean plants were planted under 1 cm of potting soil and watered every 2-3 days as necessary. Plants were grown in pots (6" wide×4.5" deep) with approximately 800 mL of soil for each plant. Seeds germinated approximately 3-5 days after being planted. Plants were grown in a greenhouse under a constant temperature and light environment (25±5° C., 12 hr: 12 hr light: dark cycle). Plants were grown until reaching 1-2 weeks old and 3-4 weeks old; these plants served as the "young" and "old" plants in this study, respectively.

Corn Plants

Corn plants were planted under ½" of potting soil and watered every 2-3 days as necessary. Plants were grown in potting plants (6" wide×4.5" deep) with approximately 800 mL of soil for each plant. Seeds germinated approximately 4-7 days after being planted. Plants were grown in a greenhouse under a constant temperature and light environment (25±5° C., 12 hr: 12 hr light: dark cycle). Plants were grown until reaching 1-2 weeks old and 3-4 weeks old; these plants served as the "young" and "old" plants in this study, respectively.

Soil Drench Assay

Formulations of the various active ingredients were created using the monoterpenoid derivatives, potassium hydroxide, and Triton-X 100™ to aid in the solvation of the active ingredient. Formulations consisted of 0.5%-1% active ingredient by weight (0.5-1 g/100 ml water), with a 1:1 molar ratio of potassium hydroxide used to aid in the solvation (135-269 mg/100 mL for both thymyloxyacetic acid and carvacryloxyacetic acid). Triton-X 100™ was introduced into the formulation to aid in solubility at a final concentration of 0.25%, 40 mL of formulation (either 0.5% or 1% active ingredient) was applied to each plant at different stages in the plant life cycle. Formulations were applied to the soil next to the base of the stem of the plant to avoid foliar contact. Observations were performed 2 days and 3 weeks after soil drench to determine the effects of the treatments on the various types and stages of plants. Qualitative data is provided in the table below demonstrating the effects of each concentration of compound on different plants and plant life stages.

Results

Compounds tested via a soil application protocol successfully inhibited the growth of plants at various stages throughout the experiment. A majority of the compounds tested significantly inhibited the growth of both young and old corn and soybean plants or caused significant phytotoxicity at 3 weeks. Control solution comprised of the formulation without the active ingredient (monoterpenoid-oxyacetic acids) did not produce a significant phytotoxic response.

When applied to soybean plants, thymyloxyacetic acid caused significant immediate effects on both young and old plants (Table 1). Young plants were susceptible to both the 0.5% and 1% concentration. 2 days after exposure to thymyloxyacetic acid, soybean plants were significantly inhibited. Minor inhibition was observed in plants exposed to the 0.5% whereas major inhibition was observed in plants exposed to the 1% concentration. This was defined as significant chlorosis and wilting of leaves. Eventually, leaves completely dried out and the plants died. At 3 weeks after exposure, young plants experienced 100% mortality and plants treated as old plants experienced mortality when exposed to the 1% concentration. The old plant treated with 0.5% thymyloxyacetic acid experienced significant wilting and chlorosis. Regrowth of dead plants was not observed 1 month after the treatment. The methyl ester of thymyloxyacetic acid, also significantly inhibited the growth of soybeans and its effect was more pronounced than both carvacryloxyacetic acid and thymyloxyacetic acid. Interestingly, the vanillyloxyacetic acid and vanillic acid-oxyacetic acid did not cause phytotoxic effects against soybean plants Corn plants reacted similarly to these concentrations of both thymyloxyacetic acid and carvacryloxyacetic acid (Table 1). At 2 days after exposure, young plants did not show any significant effects to both concentrations of both thymyloxyacetic acid and carvacryloxyacetic acid. This was markedly different than the reaction of soybeans, which exhibited significant effects at 2 days after exposure. At 3 weeks however, plants experienced significant inhibition of growth or phytotoxicity. Both thymyloxyacetic acid and carvacryloxyacetic acid caused phytotoxicity at 3 weeks after exposure. Interestingly, the 1% carvacryloxyacetic acid did not cause mortality at 3 weeks, whereas the 0.5% concentration did. This may simply be an artifact of only one replication within this study. Thymyloxyacetic acid seemed to be more phytotoxic to corn plants in this assay. At 2 days after treatment, both the 0.5% and 1% concentration was capable of causing significant phytotoxic effects against older plants. This was not the case for 0.5% carvacryloxyacetic acid, which did not cause any significant effects at 2-days. Again, it was observed that the methyl ester of thymyloxyacetic acid was the most phytotoxic to corn and both vanillyloxyacetic acid and vanillic acid-oxyacetic acid did not produce significant phytotoxic symptoms. In general, corn plants were seen to be less susceptible to these compounds compared to soybeans. This further indicates the potential of these compounds to be used as selective herbicides, with greater toxicity against dicots compared to monocots.

TABLE 1

Soil Drench Summary Table

| Treatment | Soybean | | | | | | | | Corn | | | |
|---|---|---|---|---|---|---|---|---|---|---|---|---|
| | 2-days after treatment | | | | 3-weeks after treatment | | | | 2-days after treatment | | | |
| | Young Plants | | Old Plants | | Young Plants | | Old Plants | | Young Plants | | Old Plants | |
| | 0.50% | 1% | 0.50% | 1% | 0.50% | 1% | 0.50% | 7% | 0.50% | 1% | 0.50% | 1% |
| vanillyloxyacetic acid | NOE | NOE | NOE | NOE | NOE | NOE | NOE | NOE | NOE | NOE | NOE | NOE |
| vanillic acid-oxyacetic acid | NOE | NOE | NOE | NOE | NOE | NOE | NOE | NOE | NOE | NOE | NOE | NOE |
| eugenyloxy acetic acid | - | -- | - | - | - | XXX | XXX | - | NOE | NOE | NOE | - |
| Thymyloxyacetic acid | -- | --- | - | - | XXX | XXX | - | XXX | - | - | -- | --- |
| Carvacryloxyacetic acid | --- | ---- | -- | --- | XXX | XXX | XXX | XXX | - | - | - | -- |
| thymyloxyacetate methyl ester | --- | ---- | --- | ---- | XXX | XXX | XXX | XXX | -- | -- | -- | -- |

| Treatment | Corn 3-weeks after treatment | | | |
|---|---|---|---|---|
| | Young Plants | | Old Plants | |
| | 0.50% | 1% | 0.50% | 1% |
| vanillyloxyacetic acid | NOE | NOE | NOE | NOE |
| vanillic acid-oxyacetic acid | NOE | NOE | NOE | NOE |
| eugenyloxy acetic acid | - | -- | - | -- |
| Thymyloxyacetic acid | XXX | XXX | XXX | XXX |
| Carvacryloxy acetic acid | XXX | -- | XXX | XXX |
| thymyloxyacetate methyl ester | XXX | XXX | XXX | XXX |

The efficacy of various oxyacetic acid and esters of the oxyacetic acids derived from monoterpenoid sources. The phytotoxicity of each compound is listed in qualitative terms from "No Observable Effect" (NOE), indicating no herbicidal effect noted to "Dead" (XXX), indicating the plant was dead at the designated time points of observation. The symbols, "-", "--", "---", and "------" were used to indicate phytotoxicity that did not result in death, with "-" being the lowest phytotoxic effect and "------" being the highest.

Example 3—Foliar Spray

Materials and Methods

Soybeans

Soybean plants were planted under 1 cm of potting soil and watered every 2-3 days as necessary. Plants were grown in pots (6" wide×4.5" deep) with approximately 800 mL of soil for each plant. Plants germinated approximately 3-5 days after being planted. Plants were grown in a greenhouse under a constant temperature and light environment (25±5° C., 12 hr:12 hr light:dark cycle). Plants were grown until reaching 4 weeks old and were then used for the foliar spray experiment.

Foliar Spray Assay

Formulations were made to include 1% thymyloxyacetic acid, 0.269% potassium hydroxide, and 0.25% Triton-X 100™. Soybean plants were sprayed with 10 mists from a MAINStays™ Ironing Spray bottle set to the mist setting. This corresponded to the minimum amount necessary to cause dripping from the leaves of the plants. Observations of phytotoxicity or inhibition of growth was observed at 3, 5, 7, and 14 days after exposure to the formulation. Plants were placed under high intensity light (directly below greenhouse lamps) and low intensity light (not under lamp/ambient light environment). Light intensity was chosen as a factor for this experimental design. Many terpenoids have been demonstrated to be phytotoxic under high intensity light conditions. This effect is greatly diminished under low intensity light conditions. If thymyloxyacetic acid is causing phytotoxicity in the same mechanism of action as other plant terpenoids, there should be a drastic difference in the phytotoxicity among these different levels of light intensity.

Wood sorrel on the ground of the greenhouse was also treated with active ingredient in order to better assess the effects of foliar treatments on multiple plant species. A patch of wood sorrel was (approximately 4'×3') was treated with 20 sprays (mist setting) from a MAINStays ironing spray bottle. Effects of the spray were recorded 2 days after exposure.

Results

Thymyloxyacetic acid was capable of causing significant phytotoxic effects when applied topically to 1-month soybean plants. These effects were predominantly characterized by chlorosis of the plant leaves that were sprayed with the formulation containing 1% thymyloxyacetic acid. Significant wilting also occurred followed by leaf death in each of the plants exposed to the active ingredient.

No differences were observed among the different light levels. This result indicates that thymyloxyacetic acid most likely exerts its phytotoxicity via a different mode of action from other phytotoxic terpenoids. Moreover, it is possible that these compounds may exert their activity via a similar mode of action to 2,4-dichlorophenoxyacetic acid.

Wood sorrel treatments demonstrated interesting differences between active ingredients featured in this disclosure compared to 2,4-dichlorophenoxyacetic acid, a commercial comparison. First, the effects of carvacryloxyacetic acid treatment were immediate and apparent compared to the 2,4-dichlorophenoxyacetic acid treatment. Moreover, chlorosis was far more prominent in the carvacryloxyacetic acid treatment. Death followed quickly after 2 days post-exposure in the carvacryloxyacetic acid treatment. For the 2,4-dichloroacetic acid treated plants, plant death was not observed until much later. This immediate herbicidal character is a component of all of the oxyacetic acid monoterpenoids and esters thereof described.

Table 2 is a tabular representation of the data shown in FIGS. 11 and 12. Significant leaf death and chlorosis was observed in both light levels. No major differences were observed between light levels. This indicates that these compounds exert their toxicity in a way that is unique to parent monoterpenoids applied to plant tissue in the presence of light to cause significant burndown.

TABLE 2

Summary of the Major Effects on Soybean Plants

| Treatment | Low intensity light | | High intensity light | |
| --- | --- | --- | --- | --- |
| | chlorosis | leaf death | chlorosis | leaf death |
| thymyloxyacetic acid | ✓ | ✓ | ✓ | ✓ |

Example 4—Pre-Emergence

Materials and Methods

Soybeans

Soybean plants were planted under 1 cm of potting soil and watered every 2-3 days as necessary. Plants were grown in pots (6" wide×4.5" deep) with approximately 800 mL of soil for each plant. Plants germinated approximately 3-5 days after being planted. Plants were grown in a greenhouse under a constant temperature and light environment (25±5° C., 12 hr: 12 hr light: dark cycle).

Corn Seeds

Corn plants were planted under ½" of potting soil and watered every 2-3 days as necessary. Plants were grown in potting plants (6" wide×4.5" deep) with approximately 800 mL of soil for each plant. Plants germinated approximately 4-7 days after being planted. Plants were grown in a greenhouse under a constant temperature and light environment (25±5° C., 12 hr: 12 hr light: dark cycle).

Pre-Emergence Assay 1-day after seeds/beans were planted, soil was drenched with 40 ml of formulation with 1% active ingredient. This was done to assess germination inhibition in the soil. Plants were observed at multiple time points throughout the experimental interval. Table 8 and FIGS. 13-18 featured in this disclosure demonstrate the activity of the compounds 3 weeks after application of compounds to the soil. Qualitative growth assessment was made by comparing the treated plants to the untreated controls. Observations included enhanced growth (+), minor inhibition of growth (−), major inhibition of growth (−−), plant death (XXX), and no observable effects (No effect).

TABLE 3

Effects of Compounds on Plants Before Germination
Pre-emergence Tests - Soil Treated
with 40 ml of 1% solution - 1 day after planting

| Treatment | Corn | Soy | Sorrel |
| --- | --- | --- | --- |
| thymyloxyacetic acid | − | − − − | − |
| carvacryloxyacetic acid | − − | XXX | − − |
| control | No effect | No effect | No effect |

Both thymyloxyacetic acid and carvacryloxyacetic acid had significant phytotoxic effects on all plants that were exposed to the active ingredients. Of the plants exposed, soybeans were the most susceptible. Carvacryloxyacetic acid prevented the emergence of soybean plants entirely and significantly inhibited the growth of both corn and wood sorrel. Soybean plants were also the most susceptible to thymyloxyacetic acid. However, both corn and wood sorrel growth were significantly inhibited by this compound as well. In pre-emergent applications, carvacryloxyacetic acid was the most phytotoxic of the two treatments. Moreover, dicotyledons (soybeans and wood sorrel) were more susceptible to both active ingredients than monocotyledons (corn).

Example 5—Weed Treatments

Materials and Methods

Pigweed (*Amaranthus palmeri*)

Pigweed plants were obtained from the wild in prairie fields in Iowa. Plants were carefully transplanted into pots (6" wide×4.5" deep) with approximately 800 mL of soil for each plant. Plants were maintained in a greenhouse under a constant temperature and light environment (25±5° C., 12 hr: 12 hr light: dark cycle). Plants were watered every 2-3 days as needed. Plants that did not survive transplanting were not used for this study.

Velvetleaf (*Abutilon theophrasti*)

Velvetleaf plants were obtained from the wild in prairie fields in Iowa. Plants were carefully transplanted into pots (6" wide×4.5" deep) with approximately 800 mL of soil for each plant. Plants were maintained in a greenhouse under a constant temperature and light environment (25±5° C., 12 hr: 12 hr light: dark cycle). Plants were watered every 2-3 days as needed. Plants that did not survive transplanting were not used for this study.

Dandelion (*Taraxacum officinale*)

Dandelion seeds were obtained from native prairie fields in Ames, IA. Individual seeds were sown for each pot (6" wide×4.5" deep) with approximately 800 mL of soil for each plant. Only plants that germinated were used for the study. Plants were treated 1-2 weeks post emergence. Plants were watered every 2-3 days as needed.

Lamb's Quarters (*Chenopodium album*)

Lamb's quarters seeds were obtained from the Department of Agronomy at Iowa State University. Individual seeds were sown for each pot (6" wide×4.5" deep) with approximately 800 mL of soil for each plant. Only plants that germinated were used for the study. Plants were treated 1-2 weeks post emergence. Plants were watered every 2-3 days as needed.

Giant Foxtail (*Setaria faberi*)

Giant foxtail seeds were obtained from the Department of Agronomy at Iowa State University. Three seeds were sown for each pot (6" wide×4.5" deep) with approximately 800 mL of soil for each plant. Only plants that germinated were used for the study. Plants were treated 1-2 weeks post emergence. Plants were watered every 2-3 days as needed.

Soil Drench Assay

Formulations of the various active ingredients were created using the monoterpenoid derivatives, potassium hydroxide, and Triton-X 100™ to aid in the solvation of the active ingredient. Formulations included 5% active ingredient by weight (0.5-1 g/100 ml water), with a 1:1 molar ratio of potassium hydroxide used to aid in the solvation (135-269 mg/100 mL for both thymyloxyacetic acid and carvacryloxyacetic acid). Triton-X 100™ was introduced into the formulation to aid in solubility at a final concentration of 0.25%, 40 mL of formulation (either 5% active ingredient) was applied to each plant at 1-2 weeks after emergence. Observations were performed 2 days and 3 weeks after soil drench to determine the effects of the treatments on the various types and stages of plants. Phytotoxicity is reported as percentage of total plants treated compared to a control treatment that was exposed to a similar formulation (without the active monoterpenoid derivatives).

Both thymyloxyacetic acid and carvacryloxyacetic acid were capable of killing 100% of the treated weeds that were treated from each species (Table 4). This phytotoxicity was observed relatively quickly at two days after the initial treatment.

TABLE 4

Percentage mortalities of various weed species that were exposed to 40 mL of 5% solution in soil drench assays

| | Soil Drench Mortality of Weed Species | | | | | | | | | |
|---|---|---|---|---|---|---|---|---|---|---|
| | 2-days after treatment Percentage mortality | | | | | 3-weeks after treatment Percentage mortality | | | | |
| Treatment | Pigweed | Velvet Leaf | Dandelions | Lamb's quarters | Giant Foxtail | Pigweed | Velvet Leaf | Dandelions | Lamb's quarters | Giant Foxtail |
| Thymyloxy-acetic acid | 100% | 100% | 100% | 100% | 100% | 100% | 100% | 100% | 100% | 100% |
| Carvacryloxy-acetic acid | 100% | 100% | 100% | 100% | 100% | 100% | 100% | 100% | 100% | 100% |

Example 6—Selectivity Assessment and Residual Character in Soil

Materials and Methods

Palmer Amaranth (*Amaranthus palmeri*)

Palmer amaranth seeds were obtained from the Department of Agronomy at Iowa State University. Individual seeds were sown for each pot (1.5" wide×3" deep) with approximately 7.5 g of soil for each plot. Five seeds/plot were sown into numerous plots. After one month of germination, germinated plants were counted in each plot and this number was used for the total number of plants challenged per plot in the toxicity assessment Cocklebur (*Xanthium* spp.)

Cocklebur burs were obtained from the Department of Agronomy at Iowa State University. Individual seeds were sown for each pot (1.5" wide×3" deep) with approximately 7.5 g of soil for each plot. One bur/plot was sown into numerous plots. After one month of germination, germinated plants were counted in each plot and this number was used for the total number of plants challenged per plot in the toxicity assessment.

Waterhemp (*Amaranthus tuberculatus*)

Waterhemp seeds were obtained from the Department of Agronomy at Iowa State University. Individual seeds were sown for each pot (1.5" wide×3" deep) with approximately 7.5 g of soil for each plot. Five seeds/plot was sown into numerous plots. After one month of germination, germinated plants were counted in each plot and this number was used for the total number of plants challenged per plot in the toxicity assessment.

Bluegrass (*Poa pretensis*)

Kentucky bluegrass seeds were purchased in a bag under the commercial name of. Individual seeds were sown for each pot (1.5" wide×3" deep) with approximately 7.5 g of soil for each plot. 10 seeds/plot was sown into numerous plots. After one month of germination, germinated plants were counted in each plot and this number was used for the total number of plants challenged per plot in the toxicity assessment.

Toxicity Assay

The total number of plants were counted in each plot in 24×6 hexagonal small plot planter tray. The number of germinated seeds in each plot was enumerated after one month, and for each plot this number was recorded and used as the total for each plot. Differing concentrations of thymyloxyacetic acid was applied in 5% Triton-X 100 and 1:1 molar ratio potassium hydroxide:thymyloxyacetic acid to aid in the solubility of the compound in water. Ten mL of solution was applied to each plot, and the mortality of the plants was assessed at 3 days and 2 weeks post application (for some treatments). Mortality at these time points were enumerated out of the total plants germinated in each plot at the beginning of the assay. At both time points, the total number of dead plants and total number of plants at the beginning of the assay were recorded for each observation.

A Probit model was used to calculate the $LC_{50}$ values for each of the compounds explored in this assay. A formulation control (with no active ingredient) was screened against a number of plants and factored into the final probit model. This formulation control had little-to-no effect by itself.

Results

All compounds screened in this exploration were phytotoxic to the plant species in question. The toxicity of each compound was compared to 2,4-dichlorophenoxyacetic acid (2,4-D) as a commercially available herbicide for comparison. Technical 2,4-D was purchased from Sigma Aldrich and incorporated into the formulations in the same manner as the insecticidal active ingredients described herein. The results of the toxicity of thymyloxyacetic acid compared to 2,4-D against palmer amaranth is presented in Table 4. 2,4-D was marginally more phytotoxic than thymyloxyacetic acid; however, the 95% confidence intervals significantly overlapped suggested no difference in the toxicities of both these compounds against palmer amaranth. Moreover, at two weeks after application, a significantly lower $LC_{50}$ value was observed for 2,4-D than at three days after application. This was not the case for thymyloxyacetic acid, with the $LC_{50}$ similar to one observed at three days after application. This suggests that 2,4-D is much more residual in soil than the herbicidal compounds derived from natural monoterpenoids, and is capable of exerting its effects far into the future. It is likely that thymyloxyacetic acid rapidly exerts its toxicity within the plant and quickly degrades in the soil, as suggested by this data.

The selectivity of these herbicides compared to bluegrass was also explored. If these compounds are to be used in home and garden, as well as agricultural applications, it is paramount that they act selectively against dicot weed species. Table 5 demonstrates that thymyloxyacetic acid is selective against various dicot weed species. The selectivity ratio compared to a blue grass species ranged between 2.06-5 fold for various weed species. The selectivity ratios for 2,4-D on these same weed species were 2.56-5.97 fold. Overall, the selectivity ratios for thymyloxyacetic acid were very similar compared to 2,4-D, a widely recognized selective herbicide, applied in both home and garden and agricultural field scenarios. Pictures demonstrating the phytotoxic effect against all the weed species described are presented in the accompanying figures.

To the extent necessary to provide descriptive support, it shall be understood that the subject matter and/or text of any appended claims are incorporated herein by reference in their entirety.

It will be understood by all readers of this written description that the example embodiments described herein may be suitably practiced in the absence of any recited feature, element or step that is, or is not, specifically disclosed herein.

TABLE 5

Comparison of Thymyloxyacetic Acid and 2,4-D on Palmer Amaranth

| Palmer Amaranth Compound | 3-day post application | | | | 2-week post application | | | |
| --- | --- | --- | --- | --- | --- | --- | --- | --- |
| | N | Slope (SE) | LC50 value (ppm) | 95% CI | N | Slope (SE) | LC50 value (ppm) | 95% CI |
| 2,4-D | 41 | 2.66 (0.99) | 1300 | 700-4000 | 41 | 2.72 (1.3) | 465.04 | 7-949 |
| thymyloxyacetic acid | 91 | 5.14 (1.4) | 1700 | 1300-2400 | 91 | 19.9 (3.7) | 1350 | 820-1930 |

TABLE 6

Comparison of the Selectivity of Thymyloxyacetic Acid Toward Dicot Weed Species Compared to 2,4-D

| | thymyloxyacetic acid | | 2,4-D | |
| --- | --- | --- | --- | --- |
| Compounds | $LC_{50}$ Value (ppm) | Selective Toxicity Compared to Bluegrass | $LC_{50}$ Value (ppm) | Selective Toxicity Compared to Bluegrass |
| Waterhemp | 700 | 5 | 1800 | 2.56 |
| Palmer Amaranth | 1700 | 2.06 | 1300 | 3.54 |
| Cocklebur | 1530 | 2.29 | 770 | 5.97 |

What is claimed is:

1. An herbicidal composition having systemic phytotoxic effects, comprising:

a. an active herbicidal compound consisting of thymyloxyacetic acid or methyl thymyloxyacetate, present in 0.5% to 5% by weight, based on the total weight of the herbicidal composition; and b. a carrier comprising water and potassium hydroxide, wherein the potassium hydroxide aids in solvation of the active herbicidal compound and is present in a 1:1 molar ratio with the active herbicidal compound.

2. The herbicidal composition according to claim 1, wherein the active herbicidal compound is methyl thymyloxyacetate.

3. A method for controlling or killing dicot weeds, comprising the step of: applying an effective amount of the herbicidal composition according to claim 1 to the dicot weeds, wherein the dicot weeds include pigweed, velvet leaf, dandelions, or lamb's quarters.

4. The method for controlling or killing dicot weeds according to claim 3, wherein the herbicidal composition is applied directly to the dicot weeds in a foliar spray.

5. The method for controlling or killing dicot weeds according to claim 3, wherein the herbicidal composition is applied to the soil adjacent to the dicot weeds.

6. A method for controlling or killing unwanted vegetation, weeds, or grasses comprising the step of: applying the herbicidal composition according to claim 1 directly to the leaves of the unwanted vegetation, weeds, and grasses in a foliar spray or to the soil adjacent to the unwanted vegetation, weeds and grasses.

* * * * *